Nov. 7, 1933.   B. S. LACY   1,934,433
VAPORIZATION OF FORMAMID
Filed Aug. 17, 1929   2 Sheets-Sheet 1
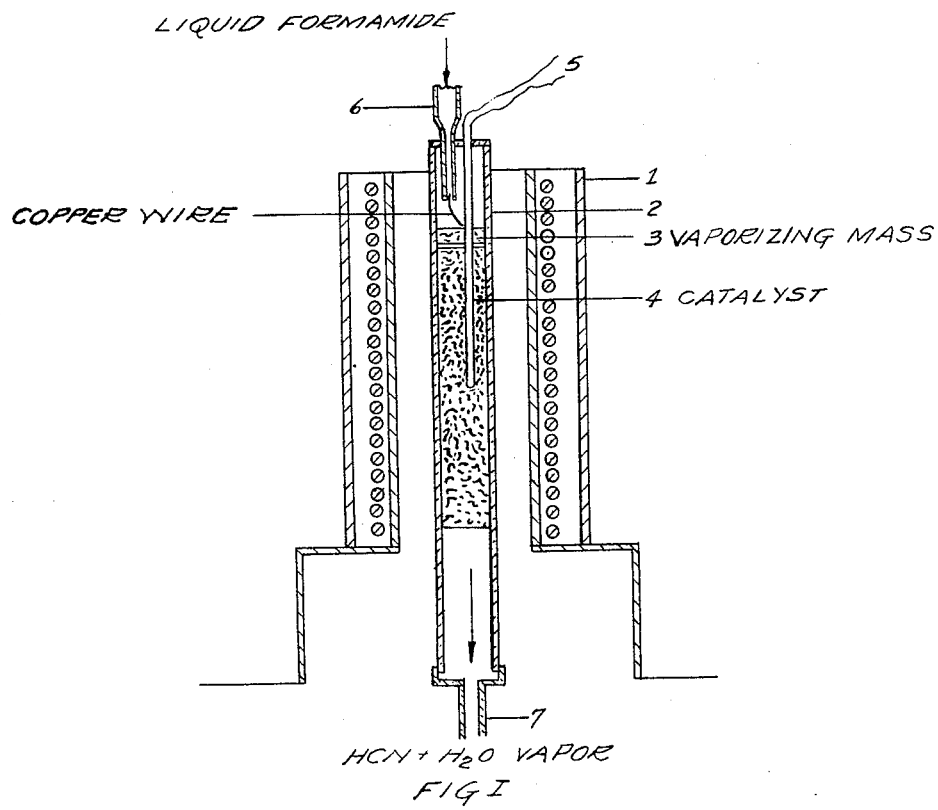
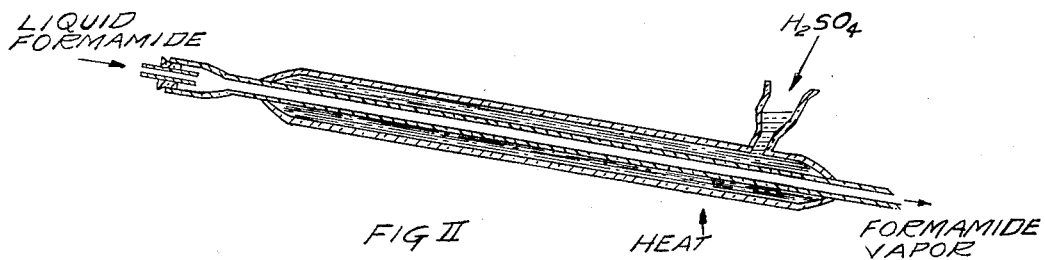

Nov. 7, 1933.  B. S. LACY  1,934,433
VAPORIZATION OF FORMAMID
Filed Aug. 17, 1929  2 Sheets-Sheet 2
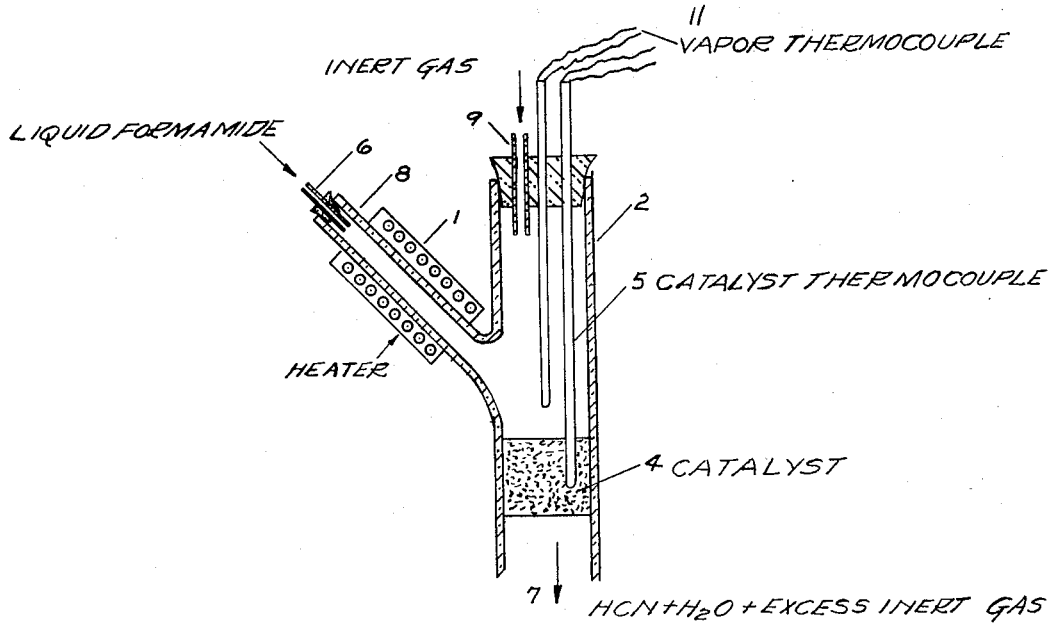
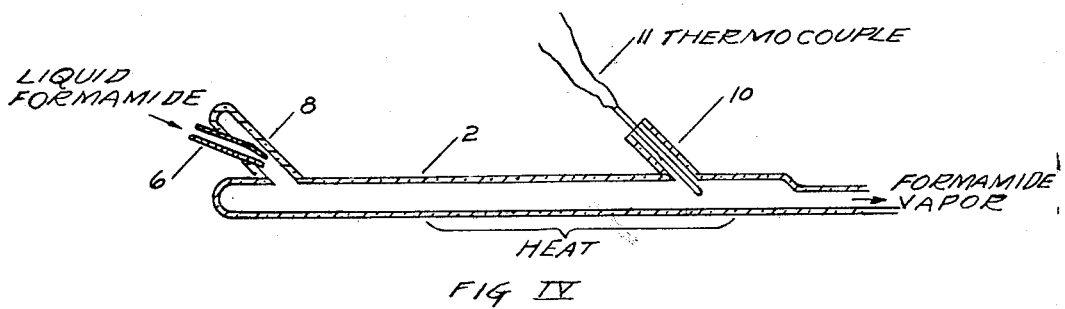
INVENTOR.
Burritt Samuel Lacy,
BY
ATTORNEY Patented Nov. 7, 1933

1,934,433

UNITED STATES PATENT OFFICE 1,934,433

VAPORIZATION OF FORMAMID

Burritt Samuel Lacy, Red Bank, N. J., assignor, by mesne assignments, to E. I. du Pont de Nemours and Company, a corporation of Delaware Application August 17, 1929. Serial No. 386,548

12 Claims. (Cl. 260—124)

This invention relates to the vaporization of formamid, and has for its object the provision of a method to secure vaporization with a minimum of loss through undesirable decomposition.

Formamid is a liquid which boils at around 200° under normal pressure, but which during such boiling partially decomposes to give chiefly $NH_3$ and CO. When the formamid is to be used for example in the production of HCN, the decomposition to $NH_3$ and CO reduces yields. There are other decompositions occurring to a lesser extent, with the formation for example of condensation products, carbonaceous material, etc., which it is also desired to avoid.

Formamid vapors can be decomposed in contact with catalysts, such as thoria, to give HCN in accordance with the following equation: $HCONH_2 = HCN + H_2O$. The preferred decomposition temperature for this purpose is above 300° C. and preferably between 400 and 650° C.

I have discovered that when formamid is heated so as to give off vapors, the chief decomposition to ammonia and CO takes place in the liquid phase, but I have also found that if the formamid vapors are exposed to superheating, i. e. above about 200° C., and to a greater extent above 300° C., except when in contact with a catalyst favoring the production of HCN, they also tend to decompose mainly to ammonia and CO, though to a less extent than when this decomposition takes place in the liquid phase. I have found that with boiling liquid formamid at about 200° C. the decomposition to $NH_3+CO$ is about 0.5% per minute of the boiling liquid formamid. The liquid after 20 minutes boiling became amber colored; after three quarters of an hour it was brown and opaque, and after one and a half hours deposited a black film on the glass. Thus boiling a body of liquid formamid for one hour would result in a loss of about 30%, but the losses are relatively small if the liquid is in contact with heated surfaces for periods of less than one minute, but not prohibitive even for periods of ten minutes.

Formamid therefore cannot be vaporized with a minimum of loss by heat decomposition, by passing a heated gas through a vessel of hot liquid formamid, nor can large bodies of formamid be boiled to produce the vapors.

My process consists in vaporizing formamid quickly and without any long continued superheating of the vapor between the time of its evaporation and its contact with the catalyst. My process provides for almost instantaneous evaporation of the liquid formamid at approximately atmospheric pressure and the conduction of the vapors thus produced as quickly as possible to the reaction zone. The formamid is vaporized by being brought into contact with surfaces heated above the atmospheric boiling point of the formamid; the liquid formamid is supplied to these surfaces at such rate that no increment of liquid is in contact with the heating surfaces for over one minute; accumulation of substantial pools of liquid on the heating surface is avoided. The liquid may be flowed onto the heated surfaces or forced thereon in small streams in the nature of a spray.

The temperature of the vaporizer surface is preferably maintained so that the vapor leaving the vaporizer is at a temperature between 200°–300° C., the vaporizer surface temperature depending on the rate of feed. I have used higher temperatures; the main requirements are that the vaporization be rapid and that the vapors are not maintained in a high temperature zone for any appreciable period but are quickly conducted to the place where they are to be used.

Methods and apparatus which I have used for such purposes are illustrated in the attached drawings.

Figure I shows a vaporizer placed in the upper portion of a silica tube and a catalyst for the production of HCN located adjacent thereto in the same tube. Figure II shows a simple vaporizer wherein the heating is accomplished by a hot liquid bath. Figure III shows a vaporizer located in one arm of Y tube and so arranged that the formamid vapors are met at the junction of the Y arms by a current of hot diluent gas and carried on into the catalyst. Figure IV shows a modification of the type shown in Figure II.

The apparatus shown in Figure I comprises essentially a vertical heated tubular furnace 1 inside of which is a silica tube 2 containing at its upper portion a layer of asbestos 3 and below this the catalyst 4 for the HCN reaction. 5 is a thermocouple, and 6 is a formamid supply tube connected by a tight joint to a glass flow gage containing a supply of formamid, (not shown) which furnishes the necessary liquid head to prevent back flow of the heated vapors and to force liquid formamid into the apparatus. The catalyst in the tube is held at a temperature of about 550° C., whereas the asbestos vaporizing pad is at a somewhat lower temperature because of the cooling due to the evaporation of the formamid. The formamid was supplied through the tube 6 and dropping on the pad 3 is practically instantaneously vaporized and immediately forced by its own vapor pressure on into the catalyst 4. It has been found that a copper wire, as shown in Figure I can be conveniently used to conduct the liquid in thin films from tube 6 to the surface of the evaporating mass thereby preventing drop formation with the concomitant slow evaporation which takes place because of the protecting envelope of vapor formed around a drop coming in contact with a hot surface.

In Figures II and IV the vaporizers and the HCN converters, not shown, are separate structures. Referring to Figure IV, the vaporizer is constructed of a Pyrex tube 2; at one end of this is a side tube 8 into which is led formamid feed line 6 connected by a tight joint to a glass flow gage containing a supply of formamid, (not shown) which furnishes the necessary liquid head to prevent back flow of the heated vapors and to force liquid formamid into the apparatus. Near the exit end of the tube is a side branch 10 for the insertion of a thermometer or a thermo-element 11. This vaporizer tube was placed in a horizontal gas fired furnace, (not shown), of the combustion type, and was inclined slightly toward the vapor exit end. The formamid supplied through the tube 6 passed through the branch 8 into the heated tube 2 where it was practically instantaneously vaporized and, without heating to above 300° C., passed directly into contact with the heated contact mass in the reactor. In various runs made with this vaporizer the formamid vapor in the region of 10 was held at a temperature between 200 and 300° C. by controlling the heat from the furnace.

Figure III shows an embodiment of my vaporizer principle wherein hot diluent gases are mixed with the formamid vapor before it enters the reaction catalyst. A silica Y tube 2 was equipped so as to provide an arm 8 as a vaporizer with electrical resistance heating device 1 and a hot gas supply arm 9. A thermocouple 11 was inserted just below the junction of the arms so as to measure the temperature of the mixed formamid vapor and gas. Immediately below the Y was placed the catalyst mass 4 having embedded in it the thermoelement 5. In operation the side arm 8 was heated in the region of the furnace 1 to a temperature of about 250° C. Formamid was supplied into this heated zone by a small bore tube 6 connected by a tight joint to a container kept filled with liquid formamid whereupon it was quickly vaporized and passed on to the junction of the Y arms. At this point it was met and mixed with a current of inert gas having a temperature of about 600° C. and immediately after this mixing the formamid vapor at the elevated temperature resulting from the mixing was carried into the catalyst mass 4.

It will be seen from the above that all of these vaporizers provide for practically instantaneous vaporization without any long continued superheating of the vapor. Heating of the vaporized formamid to the reaction temperature was rapid, i. e. formamid vapors were not maintained at elevated reaction temperatures for any appreciable period outside of the catalyst zone. The above illustrations are given by way of examples of methods of producing my results, but I do not wish to be limited thereto, since the principles may be incorporated in other structures.

The following examples will further illustrate the results which can be obtained by my method. It is understood that I do not wish to be limited to these examples as the apparatus is subject to wide variation in size, structure, etc. and the conditions maintained may likewise be considerably varied.

*Example I*

The apparatus employed for the production of HCN is illustrated in Figure I. Conditions maintained and the results attained are given below:
Size of vaporizing and reaction tube= 32″ x 1⅛″ bore
Heat supplied by furnace=about 400 watts
Rate of liquid formamid supplied=3.10 gm./min.
Temp. catalyst (ThO$_2$)=528° C.
Vaporizing surface=about 5/square inch.
HCN produced=1.19 gm./min.
Off gas rate after HCN adsorption=480 cc./min.
HCN yield=64% of theory.
Period heating liquid=less than 1 min.
Period heating vapor before reaching catalyst= less than 1 min.
Pressure in reaction chamber=about 1 atmosphere

*Example II*

HCN was produced from formamid, vaporized and passed over a catalyst. The apparatus as shown in Figure I was modified to allow a stream of N$_2$ to be supplied at the top of tube 2. The mixed N$_2$ and formamid vapor were thus passed through the vaporizing mass and catalyst. The conditions maintained and results attained follow:
Heat supplied by furnace=about 400 watts
Rate of flow liquid formamid=3.00 gm./min.
Temp. center catalyst (ThO$_2$)=395° C.
cc. formamid vapor/min. at N.T.P.=1500 cc.
N$_2$ added/min.=3000 cc.
HCN produced=1.20 gm./min.
Vaporizing surface=about 5.7 sq. in.
HCN yield=67% of theory
Period heating liquid=less than 1 min.
Period heating vapor before reaching catalyst= less than 1 min.
Pressure in reaction chamber=about 1 atmosphere.

*Example III*

Formamid was vaporized in the apparatus shown in Figure IV and passed thence to a converter not shown, which contained the catalyst and was separately heated. The conditions maintained and results attained follow:
Temp. vaporizer=280° C.
Rate formamid added=5.65 gm./min.
Volume vaporizer=about 50 cu. in.
Space velocity vapor.=about 18 per min.
Temp. converter=445° C.
HCN obtained=43% of theory
Exposure time vapor=less than 1 min.
Exposure time liquid=less than 1 min.

I claim:

1. Process for the vaporization of formamid which comprises bringing liquid formamid into contact with a surface heated to a temperature above the atmospheric boiling point of formamid at such rate that no liquid formamid remains unvaporized in contact with the heating surface for any appreciable period.

2. Process which comprises bringing liquid formamid in contact with a surface heated above the atmospheric boiling point of formamid at such rate as to prevent the substantial accumulation of liquid on the heating surface.

3. Process which comprises bringing liquid formamid in contact with a surface heated above the atmospheric boiling point of formamid at such rate as to prevent the accumulation of liquid on the heating surface and quickly thereafter removing the formamid vapors from said heating zone.

4. Process which comprises passing liquid formamid in contact with a surface heated to a temperature between 200–400° C. at such rate as to prevent substantial accumulation of liquid on said heated surface.

5. Process which comprises passing liquid formamid in contact with a surface heated to a temperature between 200–400° C. at such rate as to prevent substantial accumulation of liquid on said heated surface and quickly thereafter removing the formamid vapors from the vaporizer heated zone.

6. Process which comprises bringing liquid formamid into contact with surfaces heated above its boiling point under conditions such as will immediately vaporize said formamid and prevent any liquid formamid from remaining in the vaporizer for an appreciable period, and such that the vapors thus formed will not be further heated to decomposition temperatures in the vaporizer.

7. Process which comprises bringing liquid formamid into contact with surfaces heated to 200°–450° C. under conditions such as will immediately vaporize said formamid and prevent any liquid formamid from remaining in the vaporizer for an appreciable period, and such that the vapors thus formed will not be further heated to decomposition temperatures in the vaporizer.

8. Process which comprises bringing liquid formamid into contact with surfaces heated above its boiling point under conditions such as will immediately vaporize said formamid and prevent any liquid formamid from remaining in the vaporizer for an appreciable period, and such that the vapors thus formed will not be further heated to above 300° C. for any appreciable period in the vaporizer.

9. Process which comprises bringing liquid formamid into contact with surfaces heated to 200°–450° C. under such conditions as will immediately vaporize said formamid and prevent any liquid formamid from remaining in the vaporizer for an appreciable period, and such that the vapors thus formed will not be further heated to above 300° C. for any appreciable period in the vaporizer.

10. A process for vaporizing formamid which comprises contacting liquid formamid with a surface, heated to a temperature considerably above 215° C., while avoiding accumulation of liquid formamid.

11. A process for vaporizing formamid which comprises contacting liquid formamid in a finely distributed condition with a surface, heated to a temperature considerably above 215° C., while avoiding accumulation of liquid formamid.

12. A process for vaporizing formamid which comprises contacting liquid formamid together with a current of inert gas with a surface, heated to a temperature considerably above 215° C., while avoiding accumulation of liquid formamid.

BURRITT SAMUEL LACY.